United States Patent [19]

Nakano

[11] Patent Number: 4,732,237

[45] Date of Patent: Mar. 22, 1988

[54] SPLASH LUBRICATING DEVICE FOR A HORIZONTAL OR INCLINED ENGINE

[75] Inventor: Keiichi Nakano, Sakaishi, Japan

[73] Assignee: Kubota Ltd., Osaka, Japan

[21] Appl. No.: 856,281

[22] Filed: Apr. 28, 1986

[30] Foreign Application Priority Data

Sep. 4, 1985 [JP] Japan .......................... 60-135217[U]

[51] Int. Cl.⁴ .......................... F01M 1/04; F16N 7/16

[52] U.S. Cl. .................................... 184/6.5; 187/11.4; 123/196 R

[58] Field of Search .................. 184/6.5, 6.6, 6.7, 6.8, 184/11.4; 123/196 R

[56] References Cited

U.S. PATENT DOCUMENTS

| | | | |
|---|---|---|---|
| 747,767 | 12/1903 | Renault | 184/6.5 |
| 766,382 | 8/1904 | Potter | 184/11.4 |
| 878,783 | 2/1910 | Downie | 184/11.4 |
| 1,093,659 | 4/1914 | Thornley | 184/11.4 |
| 1,141,351 | 6/1915 | Leisse | 184/6.5 |
| 1,428,751 | 9/1922 | Burke | 184/11.4 |
| 1,558,885 | 10/1925 | Hunt | 184/11.4 |
| 2,693,789 | 11/1954 | Lechtenberg | 123/195 R |
| 4,446,828 | 5/1984 | Bauder | 123/196 R |
| 4,628,878 | 12/1986 | Nakano | 123/196 R |

*Primary Examiner*—Carlton R. Croyle
*Assistant Examiner*—Jane E. Obee
*Attorney, Agent, or Firm*—Schwartz, Jeffery, Schwaab, Mack, Blumenthal & Evans

[57] ABSTRACT

A splash lubricating device for a horizontal or inclined engine comprises an oil-spoon which is fixed to the connecting-rod of an engine having a cylinder installed on a crank case thereof horizontally or obliquely protrusively therefrom and which is provided with an oil-splash portion formed by bending laterally the lower end portion of the oil-spoon. And the oil-splash portion is turned forward by the connecting-rod along an elliptical orbit inclined forward and downward. The posture of the oil-splash portion is settled nearly parallel with an inrush angle thereof relative to the oil near an oil upper limit level in an oil pan in order to lessen the resistance put thereupon and also inclined forward and downward at a smaller angle than an outrush angle thereof relative to the oil near an oil lower limit level in order to attain good lubricating performance as well as lessen the resistance put thereupon. Hence, the splash lubricating device of the present invention accomplished not only the good lubricating performance but also the lessening of the engine power loss.

9 Claims, 5 Drawing Figures

SPLASH LUBRICATING DEVICE FOR A HORIZONTAL OR INCLINED ENGINE

BACKGROUND OF THE INVENTION

1. Field of the Invention

The present invention relates to a splash lubricating device for a holizontal or inclined engine.

2. Prior Art

In a splash lubricating device, a means for increasing a quantity of the splashed lubricating oil is shown, for example, in FIG. 3 of U.S. Pat. No. 2,693,789. U.S. Pat. No. 2,693,789 shows an oil splashing dipper secured to a connecting rod of an engine. A dipper splashes oil from the crankcase up onto the engine cylinder.

However, in the splash lubricating device disclosed in U.S. Pat. No. 2,693,789, when the oil-splash dipper 22 rushes into the oil and goes along an orbital path through the oil, it is apt to cause a loss of the engine power owing to a large resistance put thereupon. Therefore, when the engine is to be started under the condition of low temperature, the torque needed to start the engine becomes increased. And under a hot condition of the engine, since the lubricating oil temperature is further raised, the lubricating performance thereof becomes worse.

OBJECTS AND SUMMARY OF THE INVENTION

It is an object of the present invention to solve the problems noted above.

The means of the present invention for accomplishing the above object is a splash lubricating device for a horizontal or inclined engine improved as follows.

The foregoing and other objects and attendant advantages of the present invention will be readily appreciated when considered with reference to the following detailed description and the accompanying drawings.

BRIEF DESCRIPTION OF THE DRAWINGS

FIG. 1 is a longitudinal sectional view of a crank case portion of the engine.

FIG. 2 is a partly longitudinal sectional view of the whole engine.

FIG. 3 is a sectional bottom view on line III—III in FIG. 2.

DETAILED DESCRIPTION OF THE PREFERRED EMBODIMENTS

Figure 1:
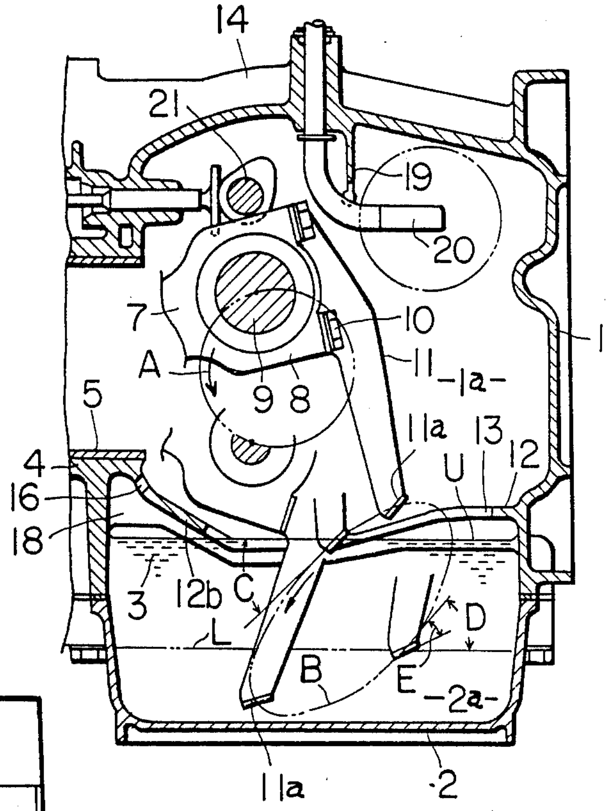
FIGS. 1 through 3 show the embodiment of the present invention applied to a horizontal engine.
Figure 5:
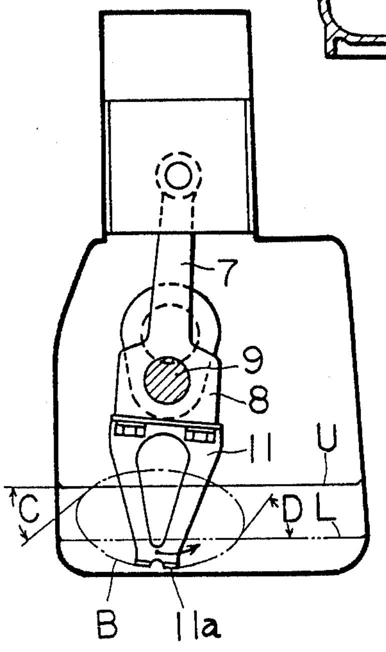
Figure 4:
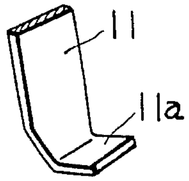
FIG. 4 is a perspective view of an oil-splash portion of an oil-spoon according to the present invention.
Figure 2:
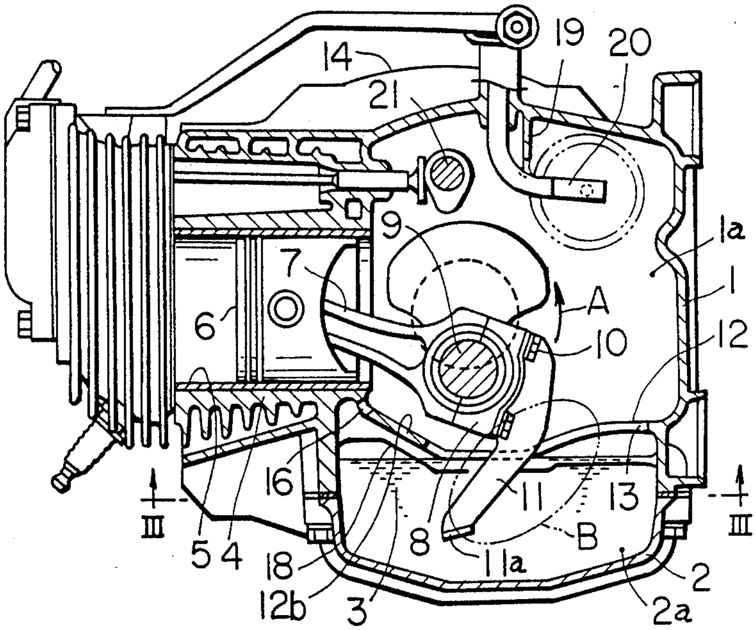
Figure 3:
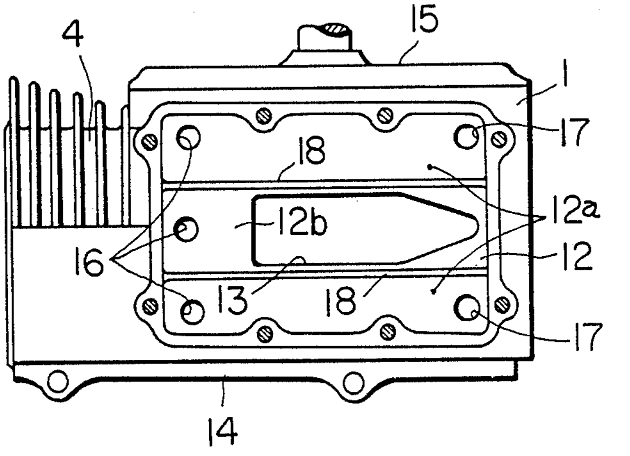

In FIGS. 1 through 4 showing the embodiment of the present invention applied to a horizontal engine, symbol 1 is a crank case, *1a* is a crank chamber, 2 is an oil pan formed at the lower portion of the crank case, 1, *2a* is an oil storage chamber, 3 is an oil, 4 is a cylinder, 5 is a cylinder liner, 6 is a piston, 7 is a connecting-rod, 8 is a connecting-rod big-end, 9 is a crank shaft, 11 is an oil-spoon fixed to the big-end 8 by bolts 10, 14 is a cooling fan case, 15 is a crank case cover, 20 is a governor lever and 21 is a cam shaft.

In the upper space of the oil storage chamber *2a*, there is provided a horizontal partition plate 12 which covers the whole oil storage chamber *2a*. The horizontal partition plate 12 is cast integrally with the lower circumferential wall of the crank case 1 of the horizontal engine. The oil pan 2 is provided fixedly at the underside of the horizontal partition plate 12.

In the central part of the horizontal partition plate 12, there is formed an opening 13 through which the oil-spoon 11 is provided so as to be able to move back and forth.

As the connecting-rod big-end 8 turns in the direction shown by the arrow A, the lower end of the oil-spoon 11 moves along the roughly elliptical orbit B and splashes lubricating oil 3 from the oil storage chamber *2a* into the crank chamber *1a*.

At both the right and left sides of the spoon passing-through opening 13 in the horizontal partition plate 12, there are provided an oil level restraining side portions *12a* which restrain oil excessive swelling due to the oil splash so as to prevent the central portion of the oil level from being lowered excessively and to ensure a sufficient quantity of a splash up oil.

Also at the fore side of the spoon passing-through opening 13 in the horizontal partition plate 12, there is provided an oil level restraining fore portion *12b* which, cooperatively with the oil level restraining side portions *12a*, restrains the forward oil level swelling in order to prevent the splash up quantity of the lubricating oil from becoming insufficient as well as to prevent the oil from flowing excessively into a cylinder and entering into a combustion chamber even if the engine is inclined forward and downward.

Holes 16 and 17 are provided for return of the lubricating oil. The lubricating oil returning hole 16 provided at the fore portion of the horizontal partition plate 12 also functions to release the air in order to prevent the oil level from swelling excessively when the engine is inclined forward and downward.

A rib 18 is formed on the underside of the horizontal partition plate 12 so as to further reinforce the horizontal partition plate 12 as a reinforcement to enhance the rigidity of the cylinder block.

An oil-splash portion *11a* provided at the lower end of the oil-spoon 11 is bent inward and laterally with its direction being inclined forward and downward. The posture of the oil-splash portion *11a* becomes nearly parallel with an inrush angle C thereof during its movement from the position of the oil upper limit level U as the standard oil level to the lower position near thereto, and portion *11a* becomes inclined forward and downward at a smaller angle than an outrush angle D during its movement from the position of the oil lower limit level L to the upper position near thereto.

Inrush angle C is the angle formed by the surface of portion *11a* and the surface of the oil in oil storage chamber *2a* at the instant that position *11a* enters the oil. Outrush angle D is the angle formed by the orbit B and the surface of the oil in oil storage chamber *2a* at the point where orbit B crosses the oil surface during the upward path of spoon 11 along orbit B.

Therefore, the oil-spoon 11 inrushes into the oil near the oil upper limit level U as if it were cutting into it with virtually no resistance by the oil during its forward and downward movement along the elliptical orbit B. Even though the orientation of the oil-splash portion *11a* becomes perpendicular to the moving direction thereof at the position near the lowermost point of the elliptical orbit B, it is offered only comparatively small resistance by the oil because of the turning speed of spoon 11 is slowest at that position.

At the position near lowermost of the the elliptical orbit B wherein the oil-splash portion 11*a* begins ascends, the orientation of portion 11*a* becomes nearly parallel with the direction of the orbit B again so the resistance by the oil is lessened. And between the position near the oil lower limit level L and the oil upper limit level U, the orientation of the oil-splash portion 11*a* forms a small crossing angle E relative to the direction of the orbit B, and the oil-splash portion 11*a* is bent inward and laterally and functions effectively. Therefore, when the oil level is kept near the oil upper limit level U as well as near the oil lower limit level L, the oil-splash portion 11*a* ensures good lubricating performance.

An excessive oil restraining plate 19 is provided protruding downward from the upper wall of the crank case 1 at the position above the elliptical orbit B and rearward of the axis of the crank shaft 9 so as to prevent the oil from being splashed up excessively when the oil level is kept near the oil upper limit level U.

Besides the above mentioned embodiment wherein the present invention is applied to the horizontal engine which has the cylinder 4 protruded horizontally and forward from the fore portion of the crank case 1, the present invention can be also applied to the inclined engine which has the cylinder 4 protruded forward and upward from the crank case 1.

Accordingly, since the present invention is constructed and functions as described above, good lubricating performance can be attained even if the oil level is kept near the oil lower limit level and the resistance put upon the oil-splash portion in the oil can be lessened so that the loss of the engine power during the engine operation is restrained less even if the oil level is kept near the oil upper limit level U. Hence, when the engine is started under a cold condition, the increase of the engine starting torque can be restrained. And even under the hot condition of the engine, the further rising of the oil temperature can be restrained and the lowering of the lubricating performance as in the prior art can be prevented.

Further, in case that the excessive oil restraining plate is formed protruding downward from the upper wall of the crank case at the position above the elliptical orbit of the oil-splash portion, oil entrance into the combustion chamber caused by the excessive supply of the oil can be prevented by the excessive oil restraining plate which checks and returns the excessive portion of the oil splashed up into the crank case, even if the oil-oil entering the oil-combustion chamber is due to the fact that oil is kept near the oil upper limit level.

I claim:

1. A splash-type lubricating device for a horizontal or inclined engine having a revolving crankshaft, comprising:

an oil pan for containing oil, the oil filling said oil pan above a lower level;

an oil spoon fixedly connected to the crankshaft for movement therewith, said oil spoon being adapted to move into, through and out of the oil as the crankshaft revolves, whereby said oil spoon spashes oil onto parts of the engine as it moves out of the oil;

an oil splash portion connected to said oil spoon for movement therewith, said oil splash portion being provided with a surface having an edge, said edge being adapted to enter the oil first as said oil spoon moves downward into the oil; and means for orienting said surface so that said surface is oriented substantially parallel to the direction of movement of said oil spoon during movement of said oil spoon into the oil, whereby resistance to the movement of said oil spoon through the oil is reduced.

2. A splash-type lubricating device as claimed in claim 1, wherein an excess oil restraining plate is secured to the engine adjacent the oil so as to prevent excess splashing of the oil.

3. A splash-type lubricating device as claimed in claim 2, wherein said excess oil restraining plate extends beyond one axial end of said crankshaft.

4. A splash-type lubricating device for a horizontal or inclined engine having a revolving crankshaft, comprising:

an oil pan for containing oil, the oil filling said oil pan above a lower level;

an oil spoon fixedly connected to the crankshaft for movement therewith, said oil spoon being adapted to move into, through and out of the oil as the crankshaft revolves, whereby said oil spoon splashes oil onto parts of the engine as it moves out of the oil;

an oil splash portion connected to said oil spoon for movement therewith, said oil splash portion being provided with a surface having an edge, said edge being adapted to enter the oil first as said oil spoon moves downward into the oil; and means for orienting said surface so that said surface is oriented at a greater horizontal inclination than the direction of movement of said oil spoon during movement of said oil spoon from the lower oil level to the surface of the oil, whereby resistance to the movement of said oil spoon through the oil is reduced.

5. A splash-type lubricating device as claimed in claim 4, wherein an excess oil restraining plate is secured to the engine adjacent the oil so as to prevent excessive splashing of the oil.

6. A splash-type lubricating device as claimed in claim 5, wherein said excess oil restraining plate extends beyond one axial end of said crankshaft.

7. A splash-type lubricating device for a horizontal or inclined engine having a revolving crankshaft, comprising:

an oil pan for containing oil, the oil filling said oil pan above a lower level;

an oil spoon fixedly connected to the crankshaft for movement therewith, said oil spoon being adapted to move into, through and out of the oil as the crankshaft revolves, whereby said oil spoon splashes oil onto parts of the engine as it moves out of the oil;

an oil splash portion connected to said oil spoon for movement therewith, said soil splash portion being provided with a surface having an edge, said edge being adapted to enter the oil first as said oil spoon moves downward into the oil; and means for orienting said surface so that said surface is oriented substantially parallel to the direction of movement of said oil spoon during movement of said oil spoon into the oil and is oriented at a greater horizontal inclination than the direction of movement of said oil spoon during movement of said oil spoon from said lower level to the surface of the oil, whereby resistance to the movement of said oil spoon through the oil is reduced.

8. A splash-type lubricating device as claimed in claim 7, wherein an excess oil restraining plate is secured to the engine adjacent the oil surface so as to prevent excessive splashing of the oil.

9. A splash-type lubricating device as claimed in claim 8, wherein said excess oil restraining plate extends beyond one axial end of said crankshaft.

* * * * *